United States Patent
Nagao et al.

(10) Patent No.: US 7,808,793 B2
(45) Date of Patent: Oct. 5, 2010

(54) CONSOLE DEVICE AND RACK-MOUNT SYSTEM

(75) Inventors: Naoyuki Nagao, Shinagawa (JP); Hideki Onishi, Shinagawa (JP); Kenichi Fujita, Shinagawa (JP); Shinichi Katayama, Shinagawa (JP); Akihiro Matsunaga, Shinagawa (JP)

(73) Assignee: Fujitsu Component Limited, Tokyo (JP)

( * ) Notice: Subject to any disclaimer, the term of this patent is extended or adjusted under 35 U.S.C. 154(b) by 1122 days.

(21) Appl. No.: 11/289,411

(22) Filed: Nov. 30, 2005

(65) Prior Publication Data

US 2006/0117085 A1 Jun. 1, 2006

(30) Foreign Application Priority Data

Nov. 30, 2004 (JP) ............................. 2004-347756
Oct. 31, 2005 (JP) ............................. 2005-317720

(51) Int. Cl.
*H05K 7/20* (2006.01)
(52) U.S. Cl. .................. 361/724; 361/679.21; 361/727; 312/223.1; 312/223.2
(58) Field of Classification Search ........................ None
See application file for complete search history.

(56) References Cited

U.S. PATENT DOCUMENTS

| | | | | |
|---|---|---|---|---|
| 3,184,276 A | * | 5/1965 | Billups | 312/274 |
| 5,732,212 A | * | 3/1998 | Perholtz et al. | 709/224 |
| 5,806,948 A | * | 9/1998 | Rowan et al. | 312/293.3 |
| 6,201,690 B1 | * | 3/2001 | Moore et al. | 361/679.21 |
| 6,305,556 B1 | * | 10/2001 | Mayer | 211/26 |
| 6,327,139 B1 | * | 12/2001 | Champion et al. | 361/608 |
| 6,353,532 B1 | * | 3/2002 | Landrum et al. | 312/223.2 |
| 6,452,809 B1 | * | 9/2002 | Jackson et al. | 361/796 |
| 6,511,139 B2 | * | 1/2003 | Liu | 312/223.2 |
| 6,520,346 B1 | * | 2/2003 | Liu | 211/26 |
| 6,567,869 B2 | | 5/2003 | Shirley | |
| 6,609,034 B1 | | 8/2003 | Behrens et al. | |
| 6,675,976 B2 | * | 1/2004 | Steinman et al. | 211/26 |
| 6,768,652 B2 | * | 7/2004 | DeLuga | 361/801 |
| 6,807,054 B1 | * | 10/2004 | Waller et al. | 361/679.09 |
| 6,856,505 B1 | * | 2/2005 | Venegas et al. | 361/679.05 |
| 6,945,412 B2 | * | 9/2005 | Felcman et al. | 211/26 |
| 6,972,949 B1 | * | 12/2005 | Helgenberg et al. | 361/679.02 |
| 7,177,162 B2 | * | 2/2007 | Yonenaka et al. | 361/826 |
| 7,414,853 B2 | * | 8/2008 | Lee | 361/726 |
| 2002/0091850 A1 | * | 7/2002 | Perholtz et al. | 709/231 |
| 2003/0041098 A1 | * | 2/2003 | Lortz | 709/203 |
| 2003/0065864 A1 | * | 4/2003 | Hollinger | 710/305 |
| 2003/0184968 A1 | * | 10/2003 | Steinman | 361/687 |
| 2005/0117310 A1 | * | 6/2005 | Miyamoto et al. | 361/724 |
| 2005/0168926 A1 | * | 8/2005 | Lee et al. | 361/683 |
| 2006/0152908 A1 | * | 7/2006 | Berstis et al. | 361/725 |
| 2006/0187648 A1 | * | 8/2006 | Watanabe | 361/727 |
| 2006/0232917 A1 | * | 10/2006 | Wu et al. | 361/681 |

* cited by examiner

*Primary Examiner*—Jayprakash N Gandhi
*Assistant Examiner*—Anthony Q Edwards
(74) *Attorney, Agent, or Firm*—Staas & Halsey LLP

(57) ABSTRACT

A console apparatus includes a console portion, which is detachably provided and with which a server apparatus can be operated, and further includes a tray portion that is attached on a rack chassis for the server apparatus and is electrically coupled to the server apparatus.

7 Claims, 20 Drawing Sheets

CONSOLE DEVICE AND RACK-MOUNT SYSTEM

BACKGROUND OF THE INVENTION

1. Field of the Invention

This invention generally relates to a console device that can be mounted on a rack chassis for a server apparatus and has console capabilities of the server apparatus.

2. Description of the Related Art

In recent years, a rack-mount structure, in which multiple servers are housed in one rack chassis, has been attracting attention, as described in, for instance, U.S. Pat. No. 6,609,034. It is possible to reduce the costs by housing multiple servers onto one rack chassis, because installation space is reduced or the display and mouse are shared. It is also possible to suppress the accident caused by an unplugged cable under the circumstances of tangles of connected cables, so that a stable operation surrounding can be provided.

FIG. 1 shows a common configuration of a rack-mount electronics apparatus. Multiple server apparatuses 200 are mounted on a rack chassis. A console portion 100, namely, a console drawer is mounted in the center of the rack chassis to slide the drawer out from the rack chassis.

In a data center, there are provided a number of the afore-described rack-mount server apparatuses. Generally, one console is installed on one rack-mount system. Therefore, the operator manages and controls the server apparatuses respectively mounted on the rack-mount systems by using the consoles respectively installed in the rack-mount systems.

Assuming that there are 10 rack-mount electronics apparatuses in the data canter and one operator controls and manages the afore-mentioned 10 rack-mount electronics apparatuses. In this case, while the operator is manipulating or managing one of 10 rack-mount electronics apparatuses, the remaining nine consoles are not used and are wasteful.

In addition, assume that there are two rows of 10 rack-mount electronics apparatuses and one operator is assigned to each row. If one of the operators is a malicious one, there is the possibility that the malicious operator illegally accesses an unauthorized electronics device, while the other operator is not present.

Furthermore, a console unit installed for the rack-mount system is generally a KVM device (Keyboard, Video, and Mouse) that processes scan codes of the keyboard, video signals of images or the like, as well as mouse signals. When the server with a serial line connection is mounted on the rack mount system having the afore-mentioned console unit, it is impossible to operate the server with the conventional console unit. In other words, the conventional console unit does not include a port for serial line connection or a signal processor.

To control the server with a serial connection, a notebook PC in which the terminal emulator software is installed has to be brought close to the rack-mount system to connect the notebook PC and the server apparatus with a serial cable.

In this method, two console devices, namely, the console portion and the notebook PC have to be used in the rack-mount system, requiring additional costs.

SUMMARY OF THE INVENTION

The present invention has been made in view of the above circumstances and provides a console device and a rack mount system that can eliminate an unnecessary console portion for cost reduction and enhance the security of a server apparatus.

According to one aspect of the present invention, preferably, there is provided a console apparatus including a console portion, which is detachably provided and with which a server apparatus can be operated; and a tray portion that is attached on a rack chassis for the server apparatus and is electrically coupled to the server apparatus. The console portion is configured to be detachable as described, making it possible to operate the server apparatuses mounted on other rack chassis with the afore-mentioned one console portion. This reduces the number of the console portions and unnecessary costs. In addition, an authorized access can be prevented by limiting the number of the console portions. This helps enhance the security. The tray portion may electrically couple the console portion and the server apparatuses either by wire or wireless.

According to another aspect of the present invention, preferably, there is provided a system having multiple rack-mount systems and a console portion, said multiple rack-mount systems respectively mounting multiple server apparatuses on multiple rack chassis. The console portion may be detachably provided from a tray portion that houses the console portion in one of said multiple rack chassis; and the console portion controls and operates said multiple server apparatuses mounted on said multiple rack-mount systems.

BRIEF DESCRIPTION OF THE DRAWINGS

Preferred embodiments of the present invention will be described in detail with reference to the following drawings, wherein.

DESCRIPTION OF THE PREFERRED EMBODIMENTS

A description will now be given, with reference to the accompanying drawings, of embodiments of the present invention.

First Embodiment

Figure 1:
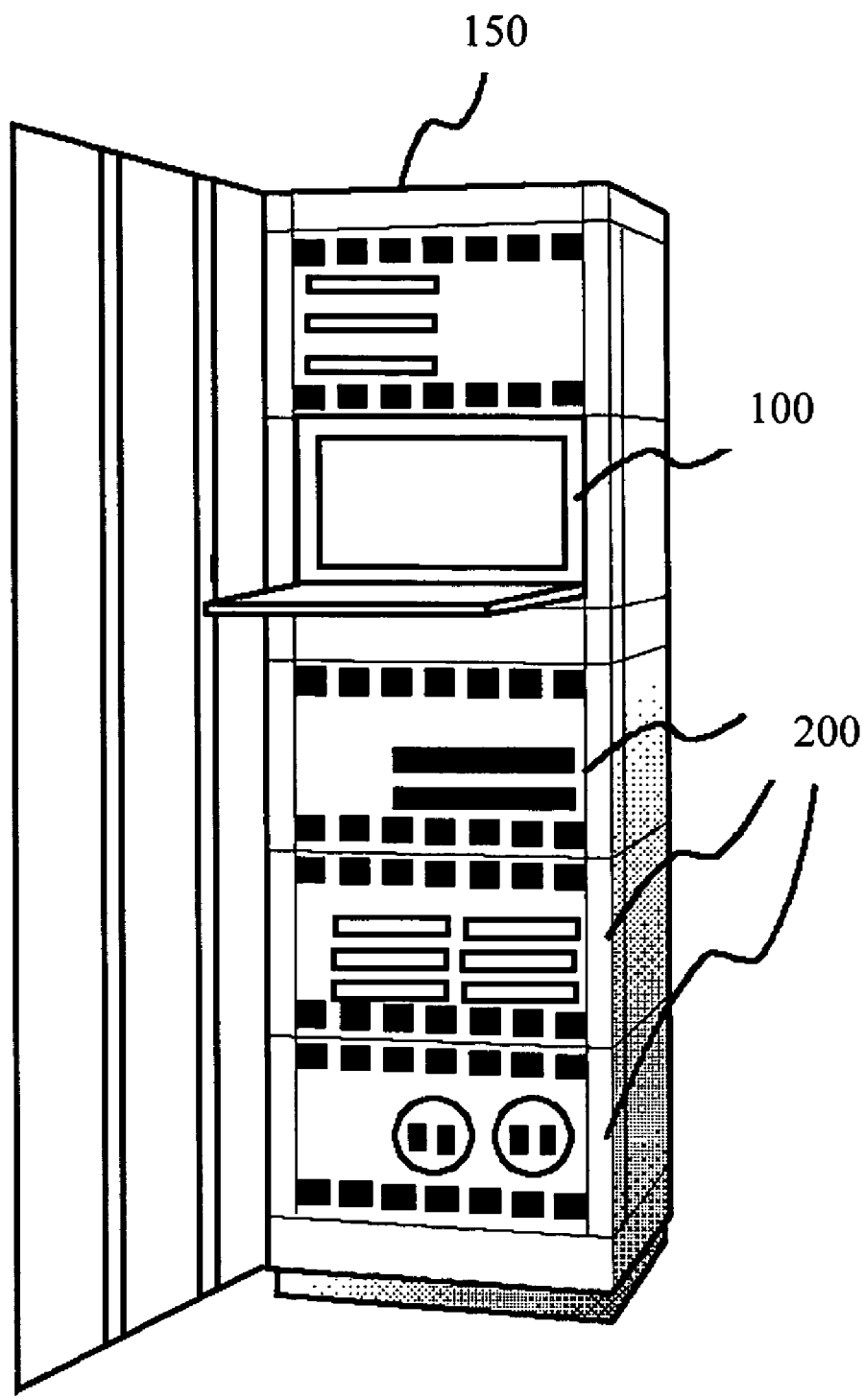
FIG. 1 shows a common configuration of a rack-mount electronics device.
Figure 2:
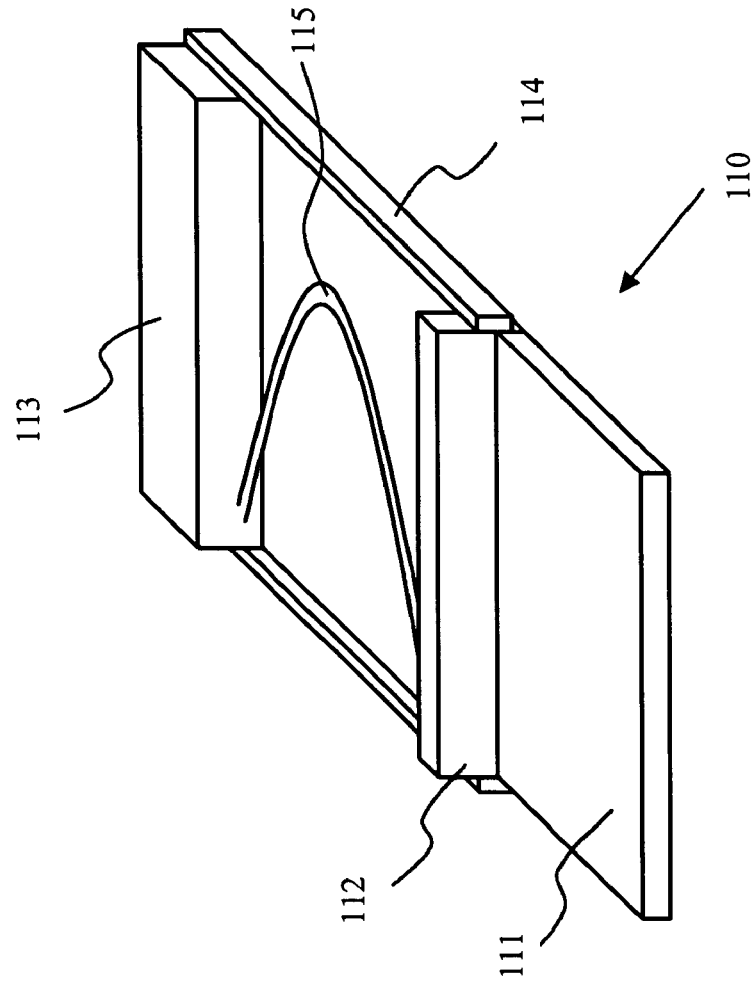
FIG. 2 shows a configuration of a console apparatus.
Figure 2:
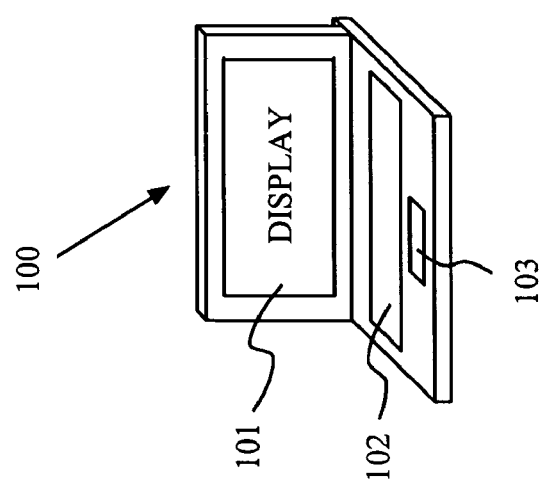

First, referring to FIG. 2, a description will be given of a console apparatus 1 in accordance with a first embodiment of the present invention. The console apparatus 1 in accordance with the first embodiment includes a console portion 100 and a tray portion 110. The console portion 100 includes a display 101, a keyboard 102, and a mouse 103. In other words, the console portion 100 is configured to be capable of controlling the server apparatus 200 housed in a rack chassis as shown in FIG. 1.

The tray portion 110 includes a tray 111, a console connector 112, and a server connector 113. The tray 111 and the console connector 112 are provided to be capable of sliding along a guide rail 114. The console connector 112 and the server connector 113 are electrically coupled by a cable 115. Here, the console connector 112 and the server connector 113, namely, the console portion 100 and the server apparatus 200 are connected by a cable, yet may electrically be coupled by wireless.

Figure 3:
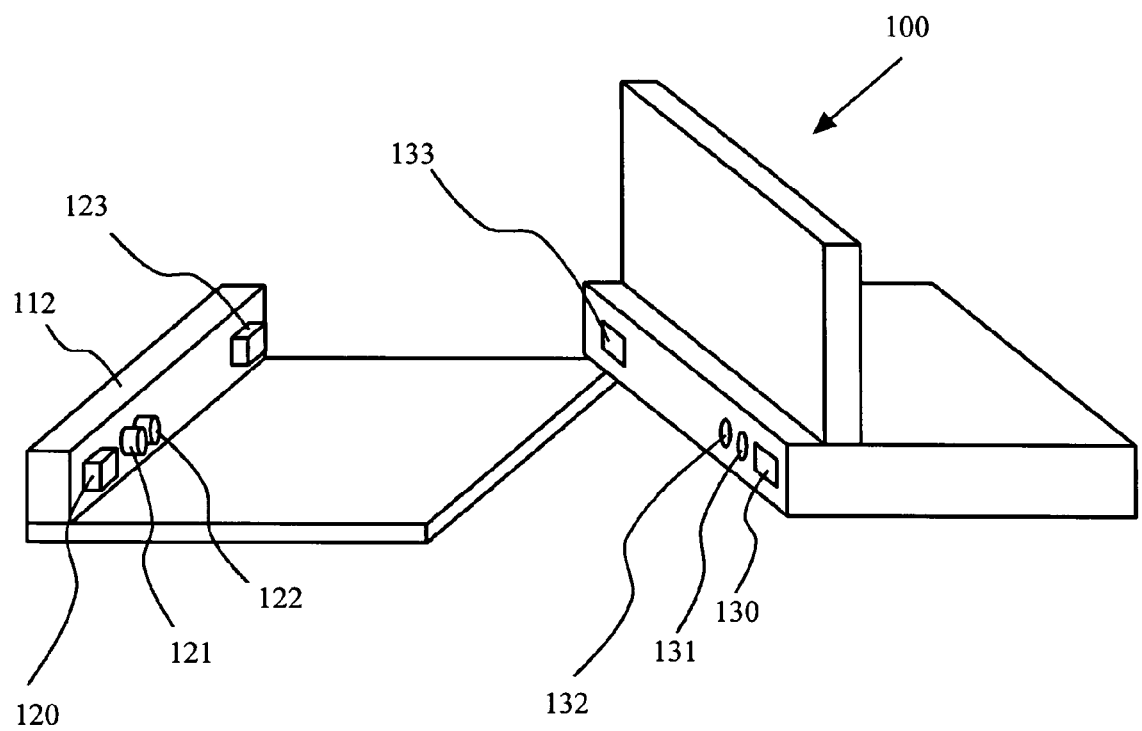
FIG. 3 shows a connection configuration of a console portion and a tray portion.

The console connector 112 establishes an electric connection with the console portion 100. Referring to FIG. 3, the console connector 112 is equipped with a VGA (Video Graphics Array) port (OUT) 120, a mouse port (IN) 121, a keyboard (IN) 122, and a power supply port (OUT) 123, which protrude on the side of the tray 111.

On the other hand, the console portion 100 is equipped with a VGA port (IN) 130, a mouse port (OUT) 131, a keyboard port (OUT) 132, and a power supply port (IN) 133. The console portion 100 has connectors of reverse polarity. The ports provided for the console connector 112 and those provided from the console portion 100 are arranged so that the corresponding ports can be connected. The console portion 100 is placed and pressed onto the tray 11. In contrast, the console portion 100 is pulled out to detach from the tray 111 to separate them. In this manner, the console portion 100 is detachably provided from the tray portion 110.

Figure 4:
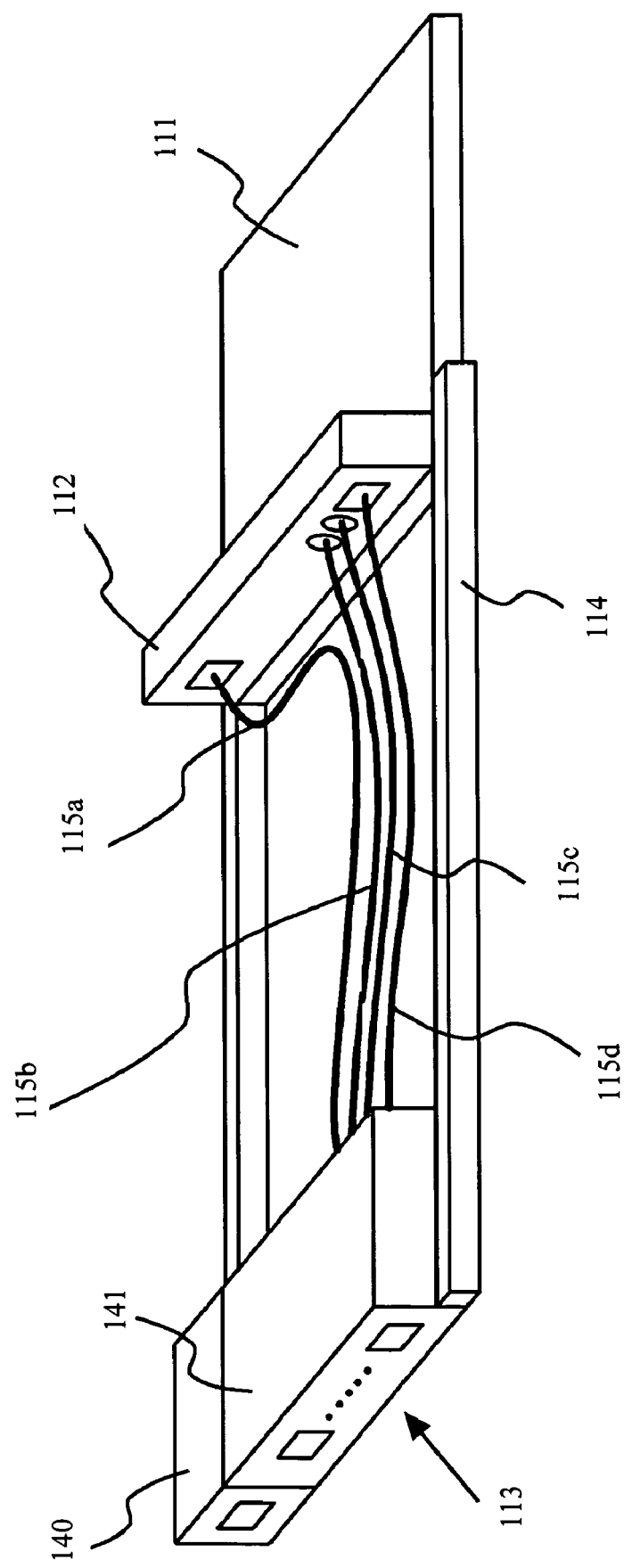
FIG. 4 shows a connection configuration of a server connector and a console connector.

FIG. 4 shows a detailed configuration of the tray portion 110. The server connector 113 includes a power unit 140 and a KVM (Keyboard, Video, and Mouse) switch 141. The KVM switch 141 is connected to the console connector 112 by the cable 115. The cable 115, as shown in FIG. 4, includes a power supply cable 115a, a keyboard cable 115b, a mouse cable 115c, and a VGA cable 115d.

Figure 5:
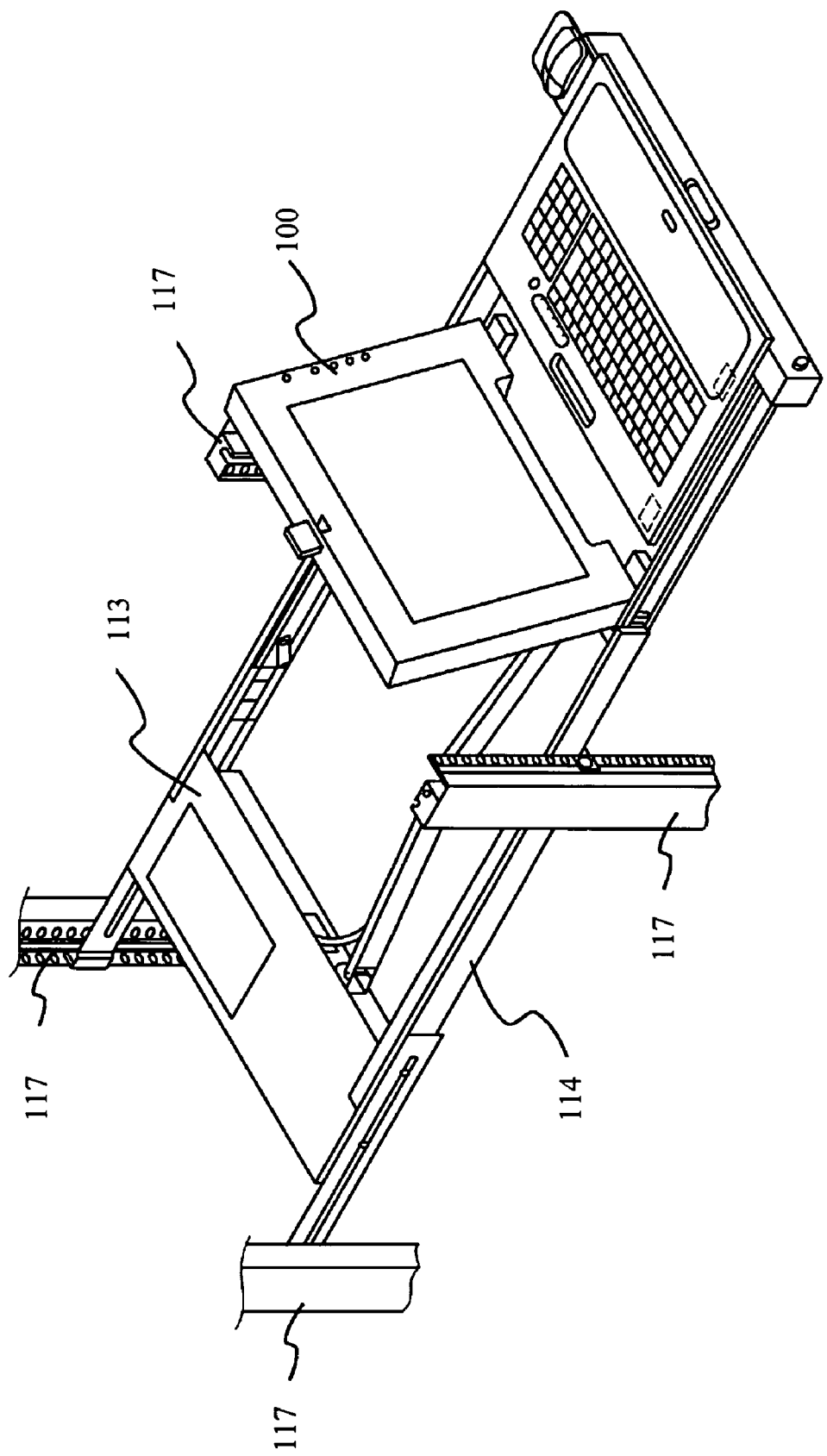
FIG. 5 shows a configuration of the console portion mounted on a rack chassis.

The console apparatus 1, which is configured as described, is housed in the rack chassis on which the server apparatus 200 is mounted. FIG. 5 shows how the console apparatus 1 is attached onto the rack chassis. As shown in FIG. 5, the rack chassis includes multiple columns (there are four columns in the present embodiment, for example), which are arranged in parallel with each other and are vertical to the guide rail 114. The console apparatus 1 having predetermined dimensions are attached within a region surrounded by the columns 117. Additionally, the rack chassis further includes a switching device for selectively changing multiple server apparatuses 200, and a power supply device.

The console portion 100 can be folded in such a manner that the display 101 overlaps the keyboard 102 with facing the operation surface of the keyboard 102, while the console portion 100 is not used. On the contrary, when the console portion 100 is used, the console portion 100 is pulled out along the guide rail 114 and the display 101 is turned up, as shown in FIG. 5.

Figure 6:
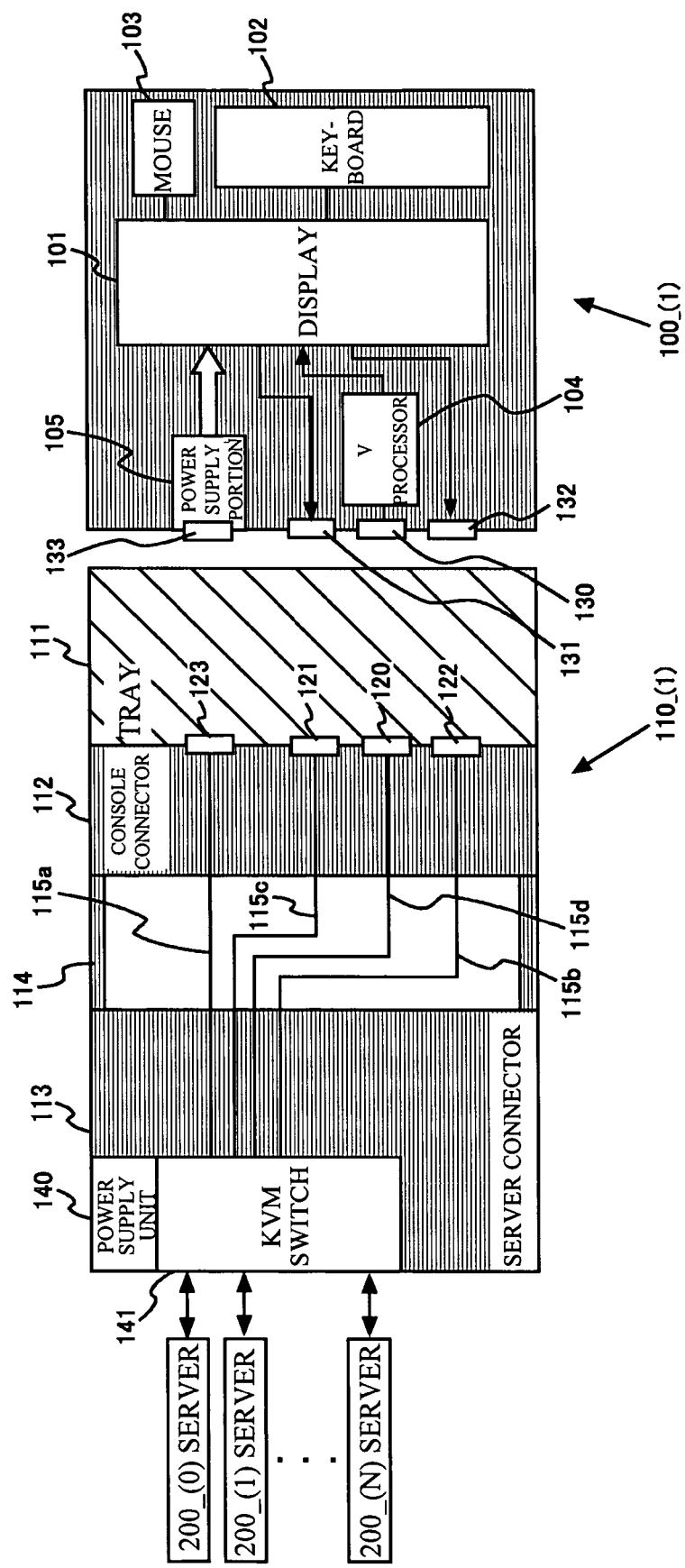
FIG. 6 shows a connection configuration of the console portion and the tray portion.

FIG. 6 shows an interconnection example of a console portion 100_(1) and a tray portion 110_(1). The KVM switch 141 provided on the server connector 113 is connected respectively to ports 120, 121, 122, and 123 of the console connector 112, by cables 115a, 115b, 115c, and 115d. The power is applied from the power supply unit 140 of the tray portion 110_(1) by way of the power supply cable 115a, and is taken into the power supply port 133 on the console portion 100_(1) to supply to a power supply portion 105. The power is then supplied to the display 101 from the power supply portion 105, and the power is supplied to the mouse 103 and the keyboard 102 from the power supply portion 105. The video signal output from the server apparatus 200 that is selectively connected by the KVM switch 141 is transmitted to the console portion 100_(1) by means of the cable 115d. The console portion 100_(1) takes in the video signal on the VGA port 130, and the video signal is processed on a video processor (simply referred to as V processor) 104 to display the video signal. The V processor 104 outputs the processed signal onto the display 101 to display the image. The mouse data output from the mouse 103 and the scan code output from the keyboard 102 are respectively output to the tray portion 110_(1) from the mouse port 131 and the keyboard port 132. The tray portion 110_(1) takes in the mouse data on the mouse port 121, and takes in the scan code on the keyboard port 122, and then transmits the codes to the KVM switch 141 on the cables 115c and 115d. The KVM switch 141 outputs the mouse data and scan code to corresponding server apparatuses 200_(0), 200_(1), . . . , and 200_(N), according to the settings.

Figure 7:
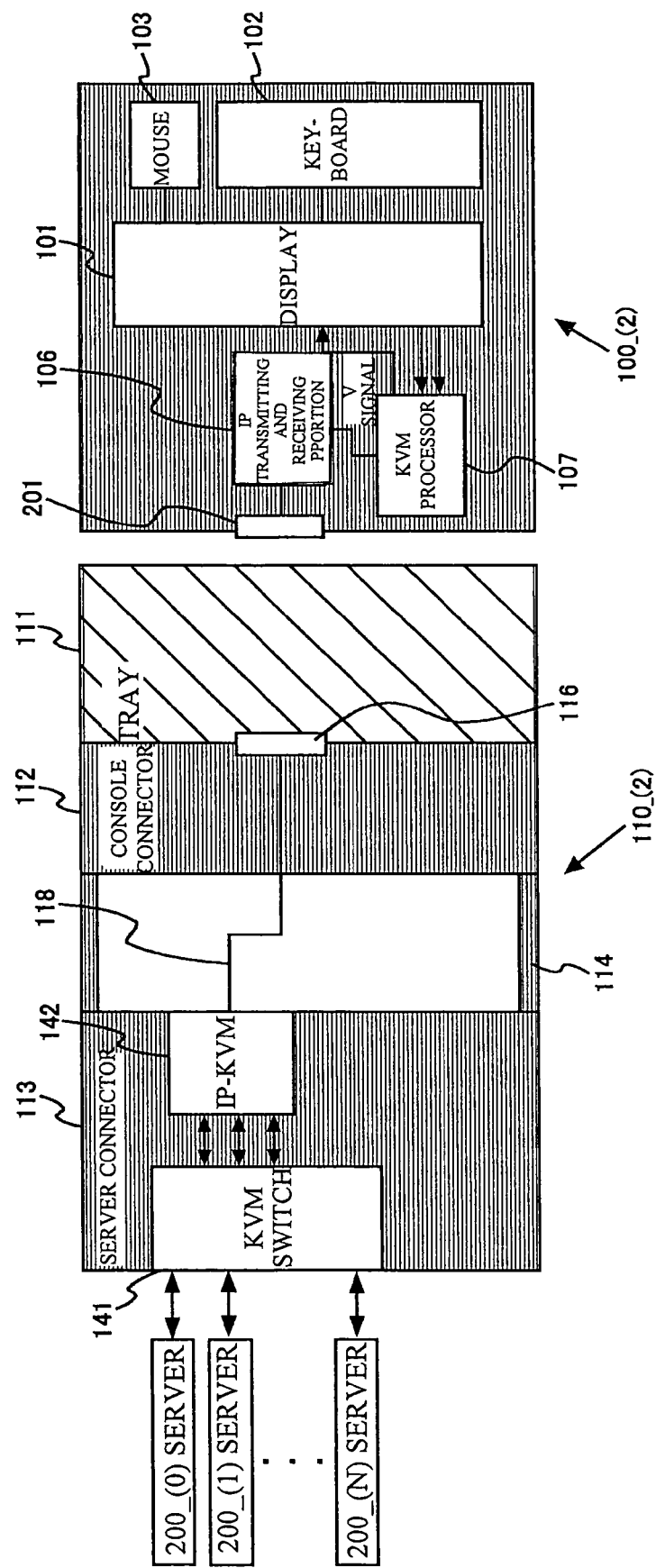
FIG. 7 shows a connection configuration of the console portion and the tray portion connected by a network cable.

The interconnection example between the console portion 100 and the tray portion 110 is not limited to the example shown in FIG. 6, and another interconnection example shown in FIG. 7 may be applicable. In FIG. 7, the server connector 113 and the console connector 112 are connected by a network cable 118. Analogue video signal sent from the server apparatus 200 is input into an IP-KVM device 142 via the KVM switch 141. The IP-KVM device 142 corresponds to a first conversion portion and a network output portion. The IP-KVM device 142 converts the analogue video signal into digital video signal, and packetizes the digital video signal. The packetized data is output to the network cable 118 by means of the IP-KVM device 142. The network cable 118 employs, for example, a CAT 5 cable. The IP-KVM device 142 and a connector 116 are connected by a crossover CAT 5 cable or a straight-through CAT 5 cable. U.S. Pat. No. 6,567,869 describes details of the IP-KVM device.

The tray portion 110 and the console portion 100 are connected by the connector 116 and a connector 201. The console portion 100 receives the packetized video signal on an IP transmitting and receiving portion 106. The IP transmitting and receiving portion 106 corresponds to a second conversion portion. The IP transmitting and receiving portion 106 takes out the digital video signal from the received packet, converts the digital video signal into the analogue video signal, and outputs the analogue video signal to a KVM processor 107. The video signal is output onto the display 101 from the KVM processor 107, and the image appears on the display 101. The mouse data output from the mouse 103 and the scan code output from the keyboard 102 are converted into packets on the IP transmitting and receiving portion 106 via the KVM processor 107, and then the packets are output to the network cable 118. The tray portion 110 receives the packets on the IP-KVM device 142 and takes out the scan code and the mouse data from the packets. The scan code and the mouse data are output to the server apparatuses 200 set on the KVM switch 141. FIG. 7 does not show the power supply unit 140, yet as shown in FIG. 6, the power supply unit 140 is provided on the server connector 113, and the power is supplied to a console portion 100_(2) by another power supply cable, which is not the network cable. In addition, the above-described power supply portion 105 is provided on the console portion 100_(2) to supply the power to the display 101, the keyboard 102, and the mouse 103. In the same manner, the console portion and the tray portion in accordance with each of second through sixth embodiments are also equipped with the power supply portion 105 and the power supply unit 140.

Figure 8:
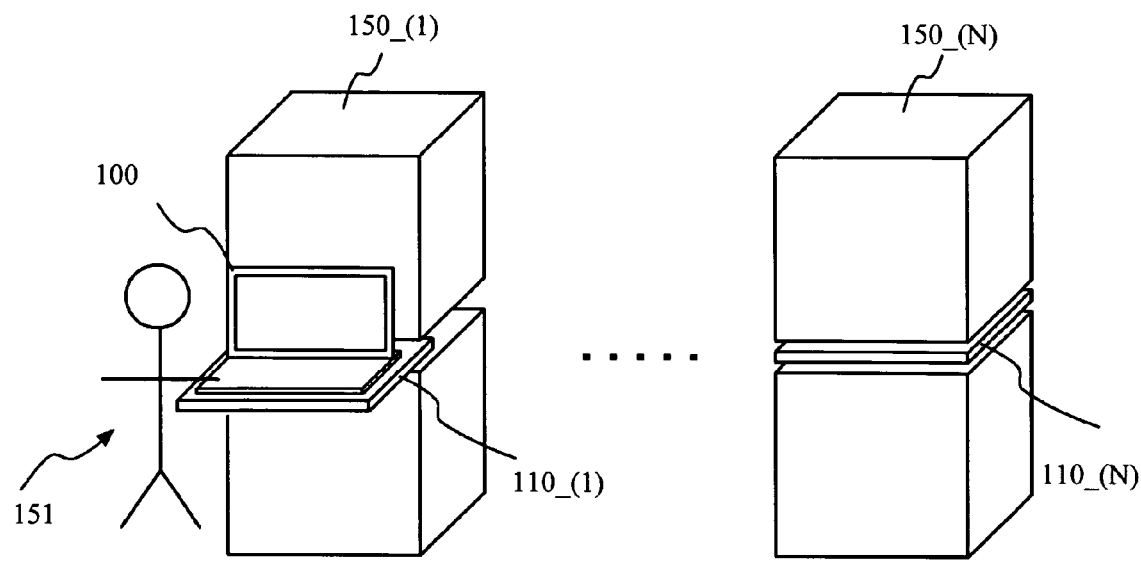
FIG. 8 illustrates how to use a rack-mount system.
Figure 9:
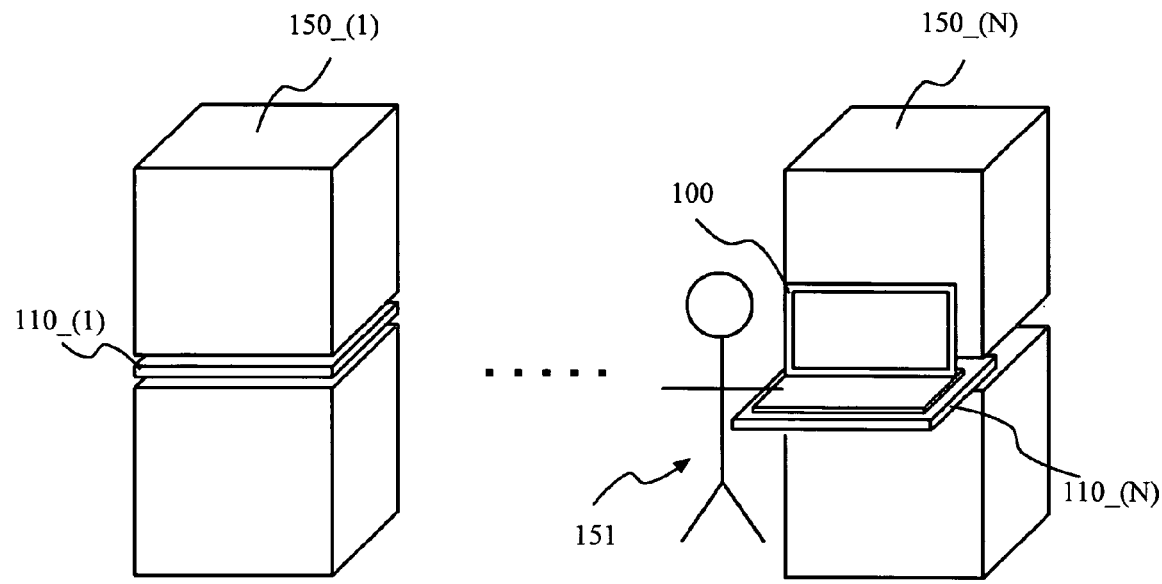
FIG. 9 further illustrates how to use the rack-mount system.

Referring now to FIGS. 8 and 9, a description will be given of how the operator operates rack-mount systems 1 through N. Hereinafter, the rack-mount system denotes a system in which multiple server apparatuses 200 and the console apparatus 1 are housed in the rack chassis.

First, an operator 151 loads a drawer type of a console portion 100 onto the tray portion 110_(1) of a rack-mount system 150_(1), as shown in FIG. 8. On the other hand, the tray portion 110_(N) of the rack-mount system 150_(N) is housed without connecting the console portion 100. In this situation, the rack-mount system 150_(1) turns in an operable state. The operator 151 uses the console portion 100 and operates the server apparatus 200 of the rack-mount system 150_(1).

Next, the operator 151 operates the rack-mount system 150_(N). The operator 151 detaches the console portion 100 from the tray portion 110_(1), and carries such detached console portion 100 to the rack-mount system 150_(N). Then, the operator 151 loads the console portion 100 carried to the tray portion 110_(N), as shown in FIG. 9. In this manner, the rack-mount system 150_(N) is operated.

In the afore-mentioned procedure, the operator 151 manages the rack-mount systems 150_(1) through 150_(N). When the operator 151 does not connect the console portion 100, only the tray portion 110 is provided in the rack-mount system 150. Therefore, even if a malicious third person pulls out the tray portion 110, there is no console portion 100. This makes it impossible to access the server apparatus 200 with the tray portion 110 only.

In the present embodiment, the console portion 100 is detachable, allowing the operator to operate the server apparatus 200 included in another rack-mount system with the use of only one console portion 100. This reduces the number of the console portions 100, and thereby cutting wasteful costs. In addition, it is possible to prevent an illegal access to the server apparatus 200 by limiting the number of the console portions 100. Accordingly, the security will be enhanced.

Second Embodiment

Figure 10:
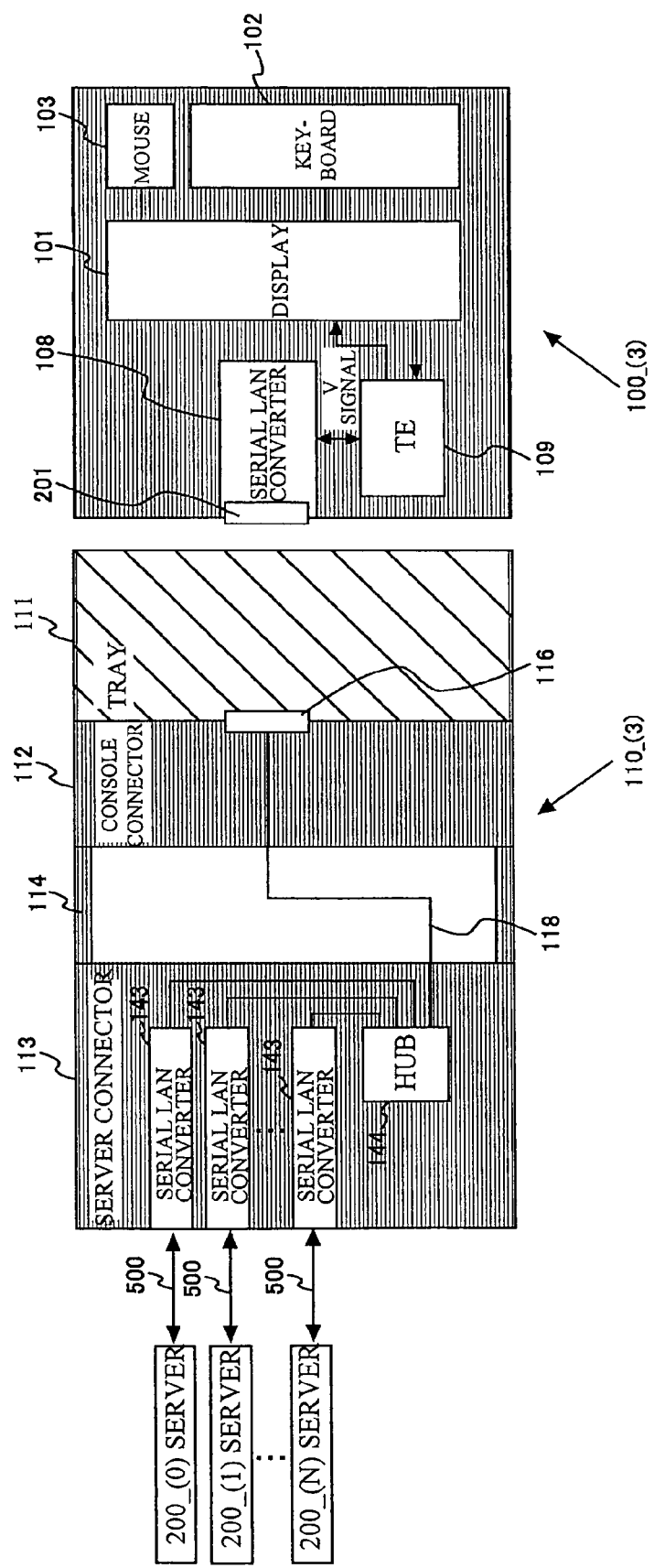
FIG. 10 shows a connection configuration of the console portion and the tray portion when a server apparatus is connected by a serial line.

A description will be given of a second embodiment of the present invention. The present invention employs a serial line for use in the connection between the server apparatus 200 mounted on the rack chassis and the console portion 100. FIG. 10 shows a configuration in accordance with the present embodiment. The server apparatuses 200_(0), 200_(1), . . . , and 200_(N) are connected to the server connector 113 by serial lines 500.

A tray portion 110_(3) includes a serial LAN converter 143 for use in connection with the server apparatuses 200. The serial LAN converter 143 corresponds to a third conversion portion and the network output portion. The serial LAN converters 143 are provided equal in number to the server apparatuses 200 mounted on the rack chassis, as shown in FIG. 10, and each serial LAN converter 143 is provided to correspond to each of the server apparatus 200. The serial LAN converter 143 is a device that makes it possible to connect various serial communications devices to a LAN, in a case where the various serial communications devices cannot be connected to a LAN. The serial LAN converter 143 receives the video signals via the serial line 500, and converts the received video signals into packets so that the packets can be sent over the LAN. The outputs from multiple LAN converters 143 are gathered on a HUB 144, and are then applied to the network cable 118 from the HUB 144.

A console portion 100_(3) receives the packets transmitted on the network cable 118, on a serial LAN converter 108, and then the packet data is converted into the serial data. The serial LAN converter corresponds to a fourth conversion portion. The serial signal converted on the serial LAN converter 108 is output to a terminal emulator (hereinafter, simply referred to as TE) 109. The terminal emulator 109 corresponds to the fourth conversion portion. The TE 109 converts the serial data that has been input into the analogue data, and outputs onto the display 101. U.S. Pat. No. 6,567,869 also describes details of the terminal emulator.

The mouse data output from the mouse 103 and the scan code output from the keyboard 102 are converted into the serial data on the TE 109. The serial data is converted into packets on the serial LAN converter 108. The packets that have been converted are output onto the network cable 118 from the serial LAN converter 108.

The tray portion 110 takes in the packets transmitted over the network cable 118 on the HUB 144, and the packets are output to the serial LAN converter 143 connected to the intended server apparatus 200, from the HUB 144. The serial LAN converter 143 that has received the packets takes out the serial data from the packets, and transmits the data to the server apparatus 200 that is being connected.

Third Embodiment

Figure 11:
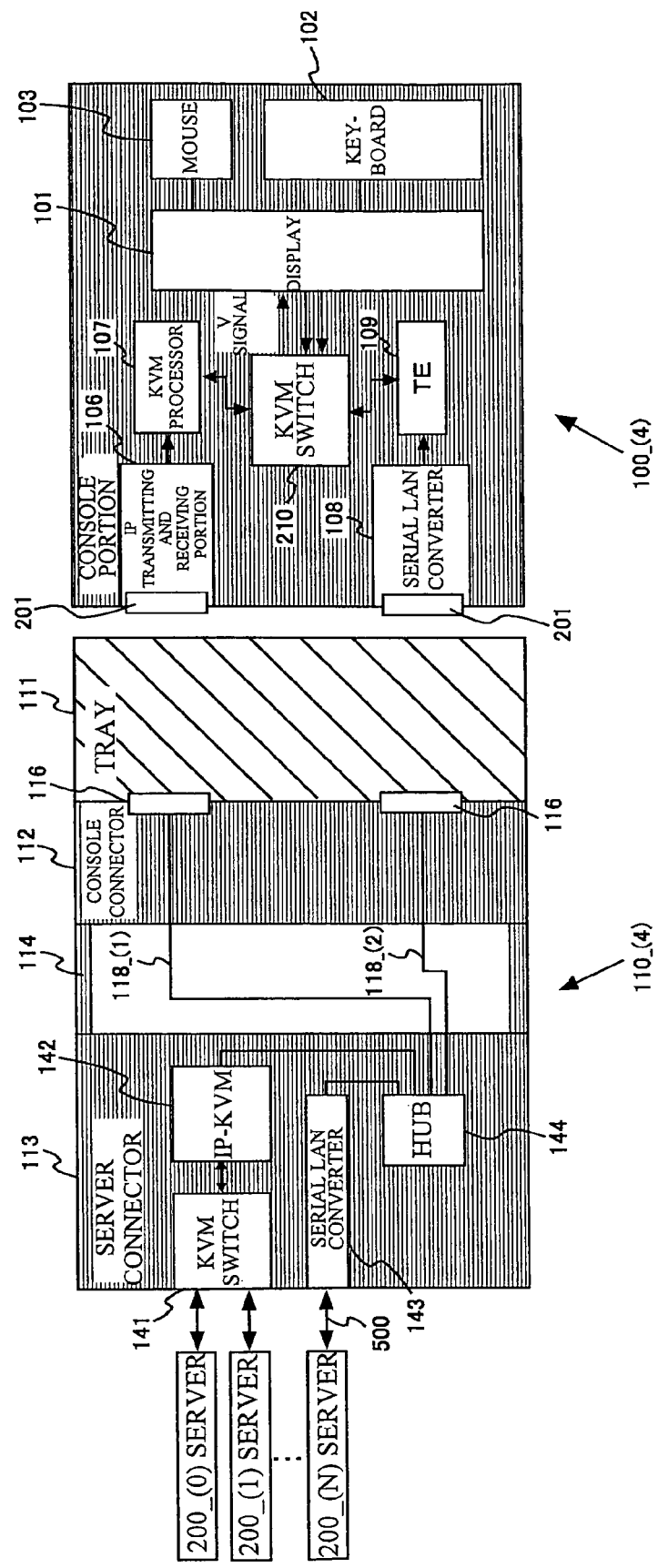
FIG. 11 shows a connection configuration of the console portion and the tray portion when there are provided the server apparatus connected by the serial line and the server apparatus selectively connected by a KVM switch.

A third embodiment of the present invention will be described, with reference to the accompanying drawings. Referring now to FIG. 11, the present embodiment of the present invention includes the server apparatus 200_(N) and the server apparatuses 200_(0) and 200_(1). The server apparatus 200_(N) is connected to the console portion 100 by the serial line and the server apparatuses 200_(0) and 200_(1) are selectively connected by the KVM switch and connected by another type of communications cable.

The serial LAN converter 143 is provided on a communications path of the server apparatus 200_(N) that uses the serial line as described in the second embodiment. The packet data is output to the network cable 118 via the HUB 144. The KVM switch 141 and the IP-KVM device 142 are provided on the communication path of the server apparatuses 200_(0) and 200_(1), selectively connected by the KVM switch 141, and the packet data is output to the HUB 144 from the IP-KVM device 142.

With respect to the network cable 118, network cables 118_(1) and 118_(2) are provided. The network cable 118_(1) is provided for the server apparatuses 200_(0) and 200_(1) that are selectively changed by the KVM switch, and the network cable 118_(2) is provided for the server apparatus 200_(N) that uses a serial line. The HUB 144 outputs the packet data of the video signal output from the server apparatus 200_(0) and 200_(1) to the network cable 118_(1), and outputs the packet data of the video signal output from the server apparatus 200_(N) to the network cable 118_(2).

In addition, a console portion 100_(4) includes the serial LAN converter 108 and the TE 109 for the server apparatus 200_(N) that uses the serial line, and further includes the IP transmitting and receiving portion 106 and the KVM processor 107 for the server apparatuses 200_(0) and 200_(1) that are selectively connected by the KVM switch 210. The analogue video signal output from the KVM processor 107 and the TE 109 is output to the display 101 by a KVM switch 210.

Furthermore, the KVM switch 210 determines which the server apparatus 200 is selected, as the mouse data is input from the mouse 103 or the scan code is input from the keyboard 102. The KVM switch 210 outputs the mouse data or the scan code to the KVM processor 107 or the TE 109, according to the characteristics of the cable being used by the server apparatuses 200. For instance, if the server apparatus 200_(0) is selected, the data is output to the KVM processor 107. If the server apparatus 200_(N) is selected, the data is output to the TE 109.

Fourth Embodiment

A fourth embodiment of the present invention will be described with reference to the accompanying drawings. In the above-described first through third embodiments, the console portion 100 and the tray portion 110 are connected by a connector. However, with a simple connection with a connector, a connector contact is worn away, as the console portion 100 is repeatedly attached and detached. This might cause a contact failure. Hence, wireless communications portions 161 and 162 are provided between a console portion 100_(5) and a tray portion 110_(5), so that the console portion 100_(5) and the tray portion 110_(5) may send and receive the data by wireless.

Figure 12:
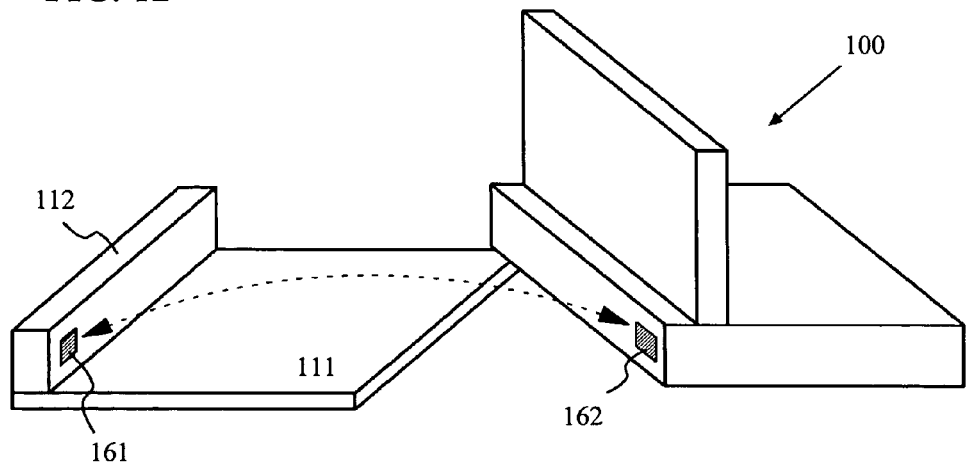
FIG. 12 shows a connection example of the console portion and the console connector and the data is transmitted and received by wireless.

FIG. 12 shows a configuration in accordance with the present embodiment of the present invention. The console connector 112 and the console portion 100_(5) respectively include the wireless communications portions 161 and 162, which communicate with each other. The data is sent to and received from the display 101, the keyboard 102, and the mouse 103 by wireless. The wireless communications method is not limited in particular, yet, for example, there are IrDA (Infrared Data Association), Bluetooth, HomeRF (Home Radio Frequency), and wireless LAN (Local Area Network).

Figure 13:
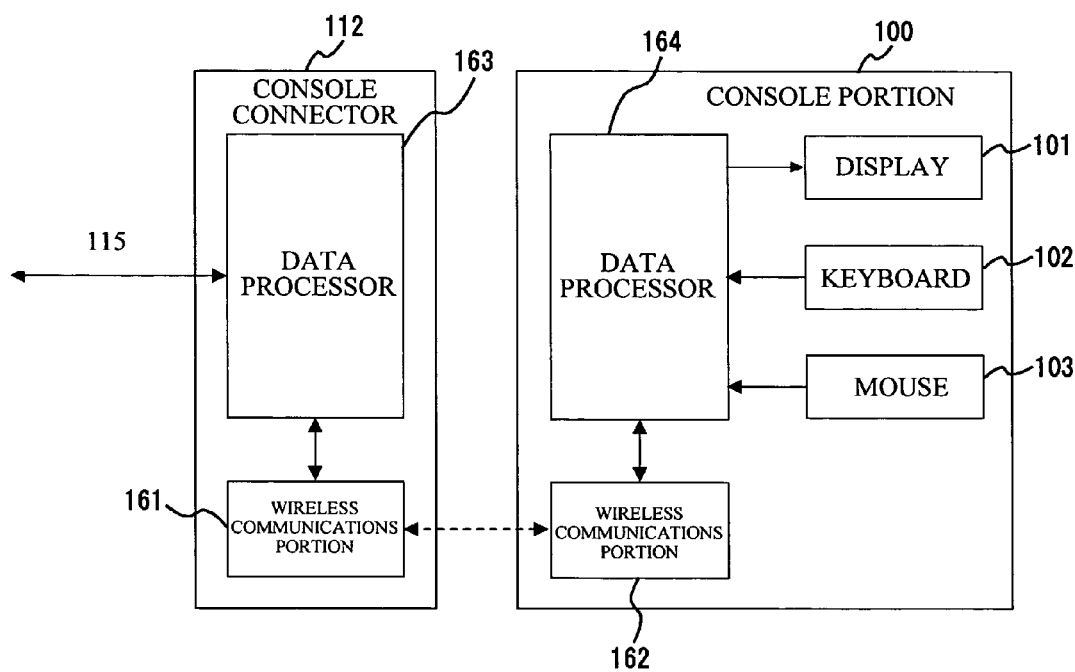
FIG. 13 shows an internal configuration of the console portion and the console connector.

FIG. 13 shows an internal configuration of the console portion 100_(5) and the console connector 112. The console portion 100_(5) includes the wireless communications portion 162 and a data processor 164. The data processor 164 displays on the display 101, the image data that has been received via the wireless communications portion 162. The data processor 164 transmits the operation input applied from the mouse 103 to the console connector 112 via the wireless communications portion 162 and the wireless communication portion 161 and the data processor 163 of the console connector.

Figure 14:
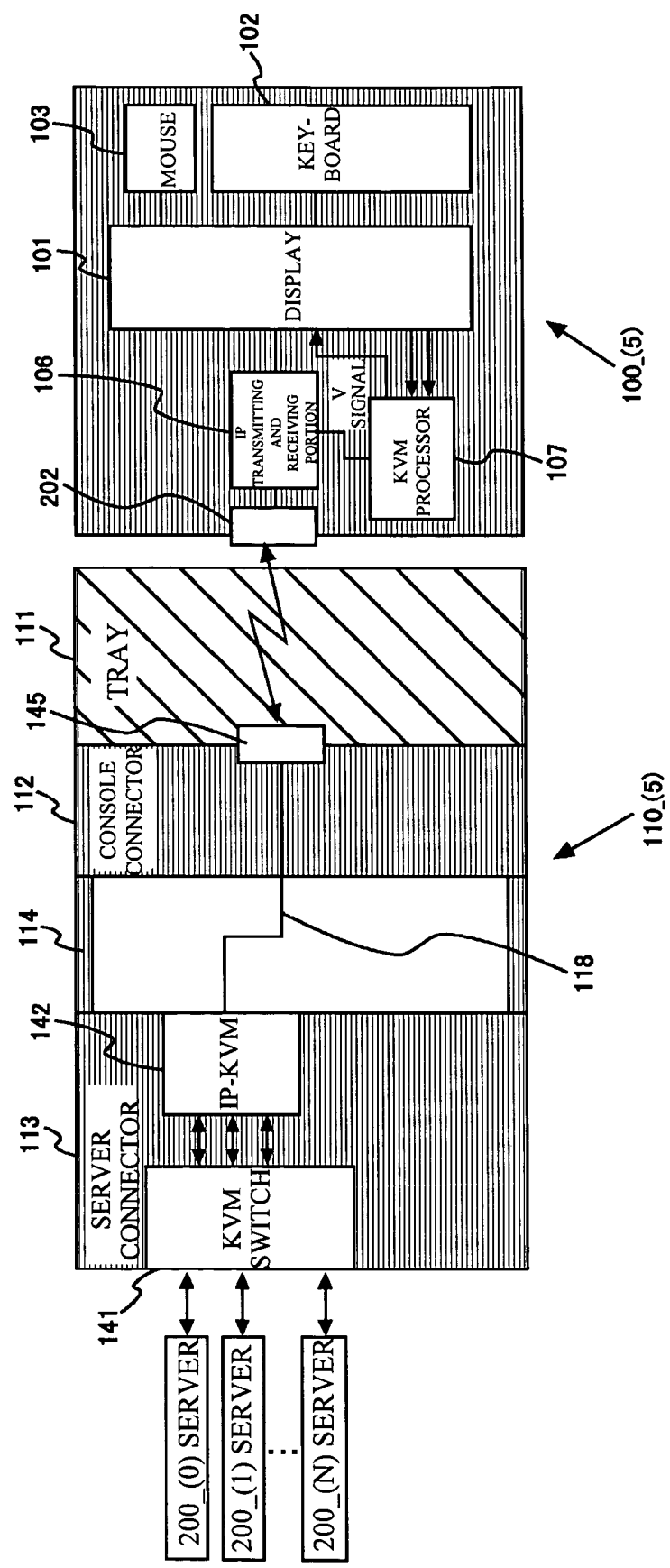
FIG. 14 shows a connection configuration when the console portion and the tray portion are connected by a wireless LAN.

FIG. 14 shows a configuration of a case where the tray portion 110_(5) and the console portion 100_(5) are communicated by wireless. The tray portion 110_(5) includes the KVM switch 141 and the IP-KVM device 142, same as those in the tray portion 110_(2) shown in FIG. 7. The packet data is output onto the network cable 118 by the IP-KVM device 142, and is transmitted to the console portion 100_(5) from a wireless LAN transmitting and receiving device 145 by wireless. A wireless LAN transmitting and receiving device 202 is provided on the console portion 100_(5), so as to receive the packet data transmitted wirelessly from the tray portion 110_(5). In addition, the mouse data output from the mouse 103 and the scan code output from the keyboard 102 are converted into the packet data on the IP transmitting and receiving portion 106, and are then output to the tray portion 110_(5) from the wireless LAN transmitting and receiving device 202. The console portion 100_(5) in accordance with the present embodiment includes the IP transmitting and receiving portion 106 and the KVM processor 107, which have capabilities, same as those of the console portion 100_(2) shown in FIG. 7.

In addition, multiple rack-mount systems 150 may be communicated by wireless. In this case, referring to FIG. 15, wireless communications portions 170 provided on the console connectors 112 are communicated with each other so as to send and receive data between adjacent trays 111. Here, serial ID numbers are assigned to the respective rack-mount systems. The console portion 100 or the server apparatus 200 gives serial ID numbers to the data for sending and receiving the data. The wireless communications portion 170 takes in the data only when the data has the serial ID number assigned thereto, and transmits other data to another rack-mount system 150. In the afore-mentioned configuration, the console portion 100 does not have to be detached from the tray portion 110 for carrying to another rack-mount system 150, and thereby enabling the reduction of cumbersome operation.

Figure 15:
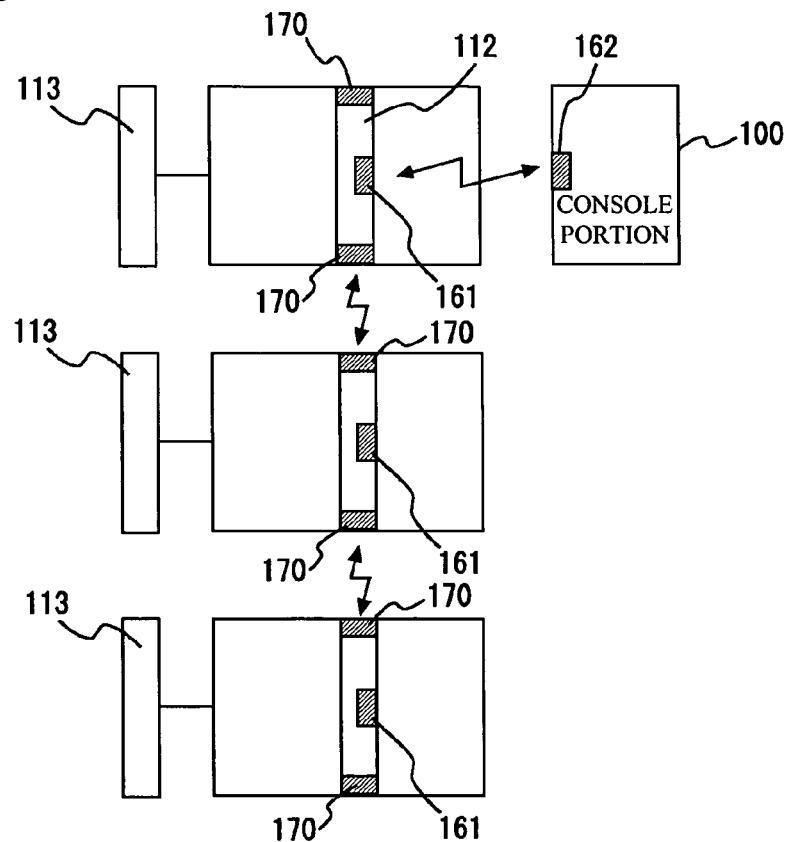
FIG. 15 illustrates a communication between the rack-mounts systems.
Figure 16:
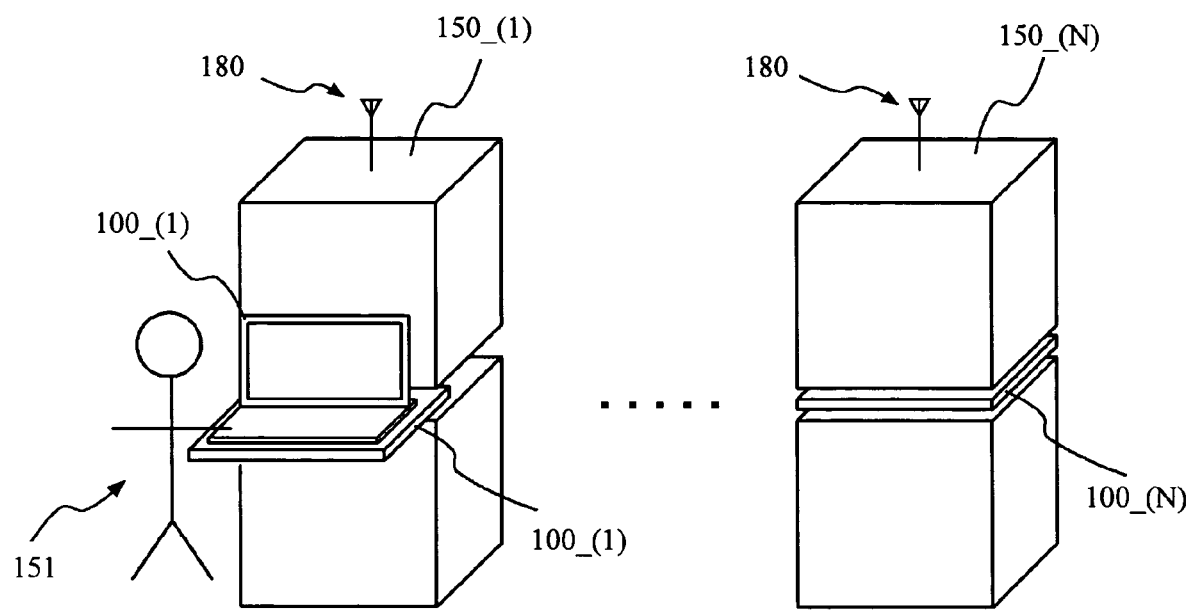
FIG. 16 illustrates the communication between the rack-mounts systems.

Further, in the embodiment as shown in FIG. 15, the description has been given of the example of wireless communication method between the tray portions 110. However, referring now to FIG. 16, an antenna 180 is attached onto the rack chassis of the rack-mount system 150, so that the console portion 100 may communicate with the rack-mount system 150 by wireless via the antenna 180. In this case, the rack-mount system 150 has to be equipped with a control device that sorts the data received via the antenna 180 to the respective server apparatuses 200.

Fifth Embodiment

The wireless communication method has been described in the fourth embodiment, yet there is the possibility that the data is sniffed, as a shortcoming of the wireless communication. To address the afore-mentioned shortcoming, the distance of the wireless communication may be limited between the wireless communications portion 162 of the console portion 100 and the wireless communications portion 161 of the console connector 112. For instance, the communications distance may be set to 20 cm, when the specification of IrDA 1.3 is employed. The communications distance is limited within a given one, and thereby one-to-one communication is secured between the console portion 100 and the console connector 112 to prevent the data sniffing.

Sixth Embodiment

Figure 17:
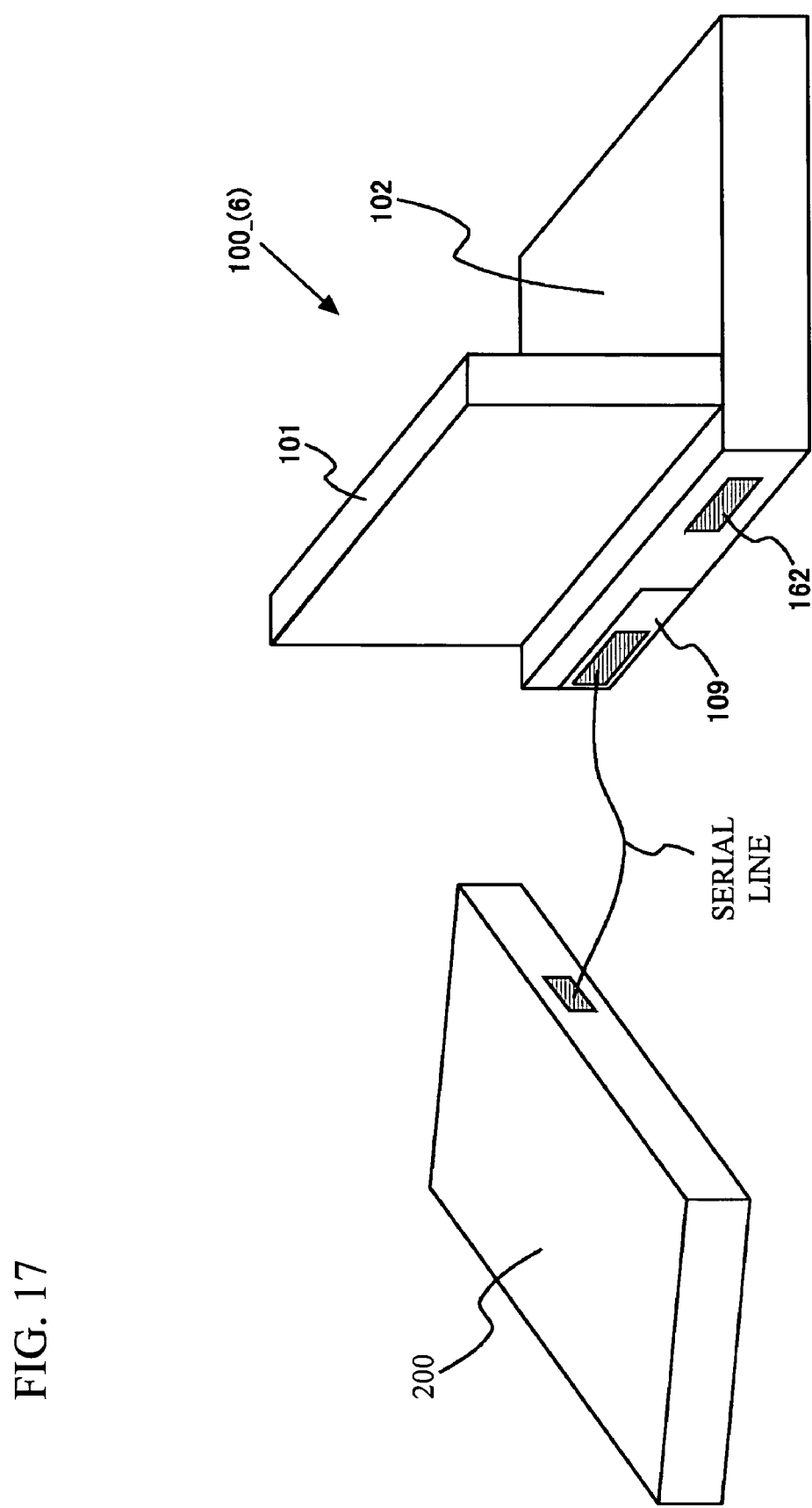
FIG. 17 shows a configuration in which the server apparatus is directly connected to the console portion.

A sixth embodiment of the present invention will be described, with reference to the accompanying drawings. In the resent embodiment, the console portion 100 is detached from the tray portion 110 and the console portion 100 is directly connected to the server apparatus 200 that uses the serial line. FIG. 17 shows a connection between a console portion 100_(6) and the server apparatus 200.

Figure 18:
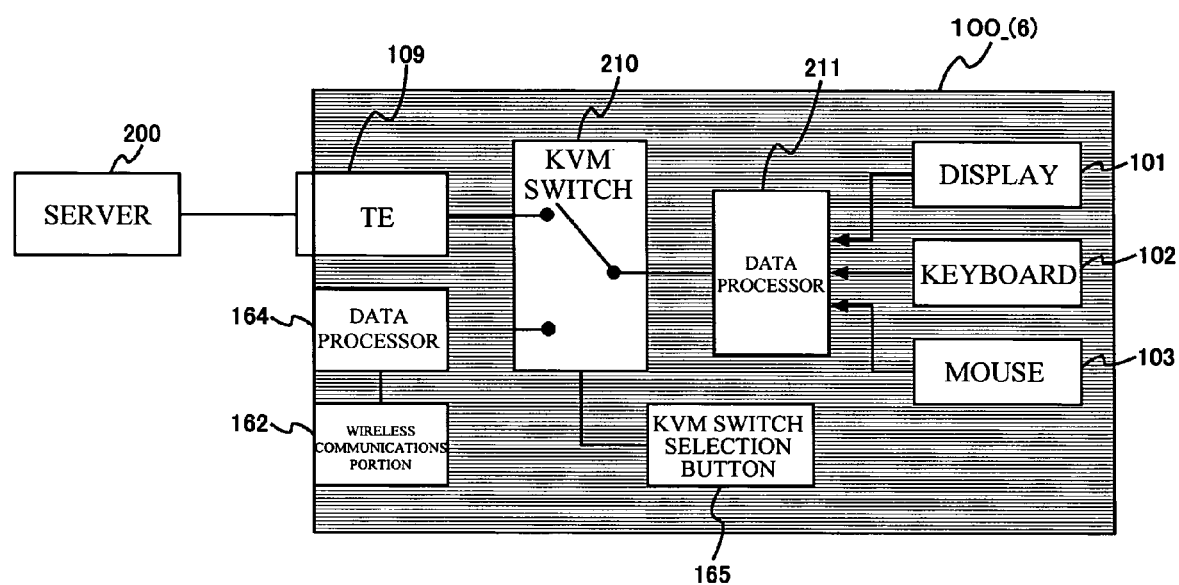
FIG. 18 shows a configuration of the console portion directly connected to the server apparatus.

Referring now to FIG. 18, the server apparatus 200 is directly connected to the console portion 100 by means of the serial line. The server apparatus 200 is connected to the terminal emulator (TE) 109. The TE 109 is connected to the KVM switch 210. The KVM switch 210 is also connected to the data processor 164. The KVM switch 210 selectively changes the connection between the TE 109 and the data processor 164. In addition, the KVM switch 210 is connected to a data processor 211, and the data output from the keyboard 102 and the mouse 103 are output to the KVM switch 210 from the data processor 211. Furthermore, the KVM switch 210 is connected to a KVM switch selection button 165. The KVM switch selection button 165 is capable of selectively changing a connection target to which the KVM switch 210 is connected. That is to say, it is possible to selectively change the connection to the server apparatus 200 by the serial line and the wireless connection by means of the wireless communications portion 162.

The server apparatus 200 that is connected to the console portion 100 by the serial line outputs the video signal to the console portion 100. The TE 109 outputs the video signal to the KVM switch 210. The video signal is output to the data processor 211 from the KVM switch 210. The data processor 211 processes the video signal to display on the display, such processed data is output on the display 101.

The operator sees the display 101 and implements the key input or the mouse operation. The scan code or the mouse data that has been input is transmitted to the KVM switch 210 from the data processor 211. The KVM switch 210 is connected to the server apparatus 200 by the serial line to send the scan code or the mouse data to the TE 109. The TE 109 sends the scan code or the mouse data to the server apparatus 200 by the serial line. This makes it possible to operate the server apparatus 200.

The operator manipulates the KVM switch selection button 165 to selectively change the connection of the KVM switch 210 so as to change the connection with the server apparatus 200 to the wireless communication. The KVM switch 210, the connection of which is changed by the data processor 164, changes a data output destination to the data processor 164. The data processor 164 converts the data into the packets for wireless communication, and outputs to the wireless communications portion 162. Such packets are transmitted to the server apparatus 200 from the wireless communications portion 162 by wireless.

In the present embodiment, it is possible to detach the console portion 100 and operate the server apparatus 200 that is not equipped with, for example, the console portion permanently. In addition, an internal memory, not shown, or an external medium may store the character codes, as a log, transmitted to the console portion 100 from the server apparatus 200.

In the present embodiment, the KVM switch selection button 165 is provided only for selection, yet a hot key on the keyboard may be used for selectively changing the wireless communication and the connection by the serial line. Further, to selectively change such communication, the capabilities of OSD (On Screen Display) included in the KVM switch 210 may be utilized to show an operation button on the display 101.

The console portion 100_(6) in accordance with the present embodiment does not take time to activate, unlike the notebook PC. This is because the respective devices that make up the console portion 100 are immediately activated subsequent to the power on. The notebook PC on which the terminal emulator software is installed needs the activation period for OS and the terminal emulator software. This wastes the operation period. However, it is possible to start the operation immediately with the use of the console portion 100 in accordance with the present embodiment, and thereby enabling shortening the operation period.

Seventh Embodiment

A seventh embodiment of the present invention will be described, with reference to the accompanying drawings. In the above-described first through sixth embodiments, the console portion 100 is operated with the power supplied by the power supply unit 140, which is provided on the tray portion 110, while the tray portion 110 is being connected. However, the console portion 100 is not always mounted on the tray portion 110, while the console portion 100 and the tray portion 110 are communicated by wireless as described in the fourth and the fifth embodiments. Hence, in the present embodiment, as shown in FIG. 19, a console portion 100_(7) is equipped with a battery 350 so that the console portion 100 may operate with the power supplied by the battery 350.

A tray portion 110_(7) includes a battery charger 301 to charge the battery 350. As shown in FIG. 19, the battery charger 301 is connected to an external power supply 300, which is an uninterruptible power supply system or the like, so that the power is supplied from the external power supply 300 to charge the battery 350. The console portion 100_(7) is mounted on the tray 111 and the tray portion 110_(7) and the console portion 100_(7) are electrically connected. The battery charger 301 and the battery 350 are connected by connectors 302 and 351. When the battery charger 301 is connected to the battery 350, the current is applied to charge the battery charger 301 and the battery 350 is thus charged.

Figure 19:
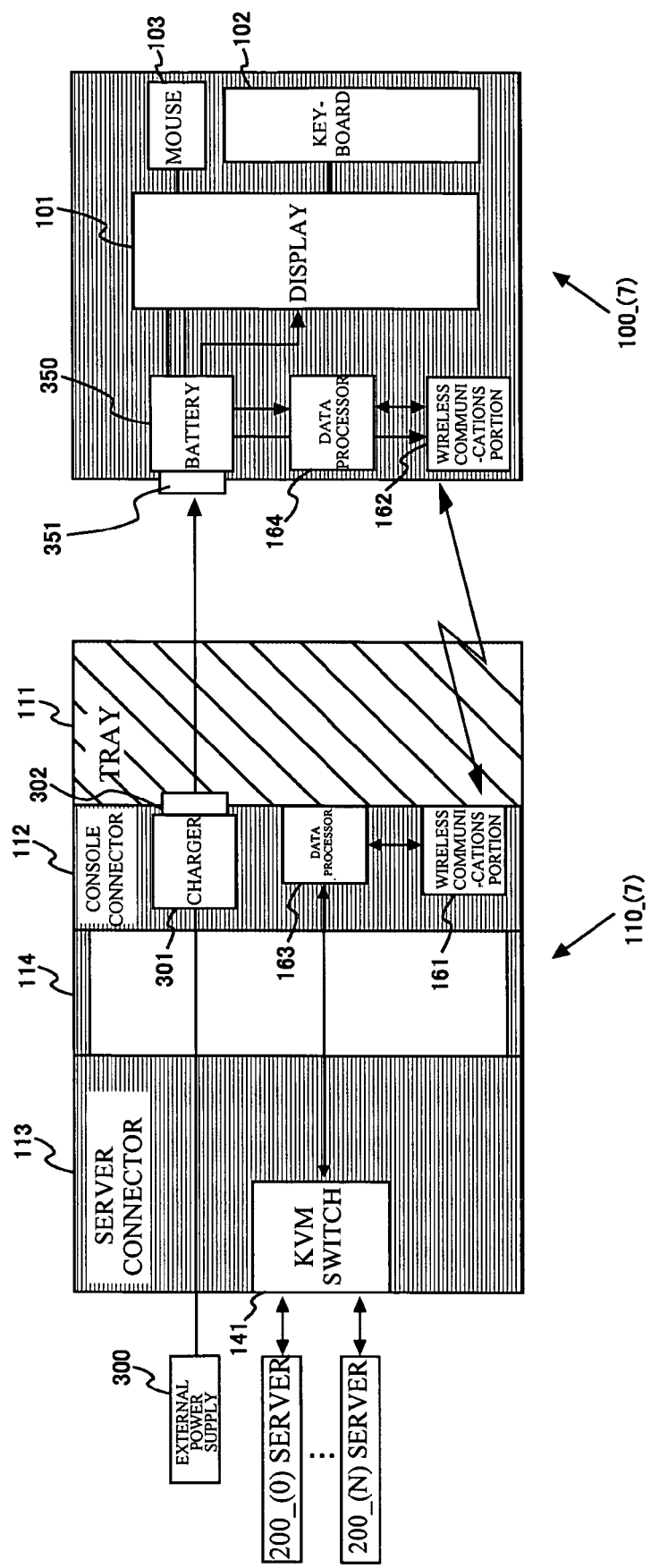
FIG. 19 shows a configuration of the console portion and the tray portion when a battery is mounted on the console portion.

In the configuration shown in FIG. 19, the tray portion 110_(7) and the console portion 100_(7) have to be connected by the connectors 302 and 351 while the battery 350 is being charged. However, referring now to FIG. 20, a primary coil 304 is provided on the tray 111 and a power receiving portion 360 having a secondary coil 361 is provided in a console portion 100_(8). It is possible to readily charge the battery 350, by supplying the power to the battery 350 with the use of the electromagnetic induction phenomena. That is to say, the battery 350 is charged only by mounting the console portion 100_(8) on a given position on the tray 111.

Figure 20:
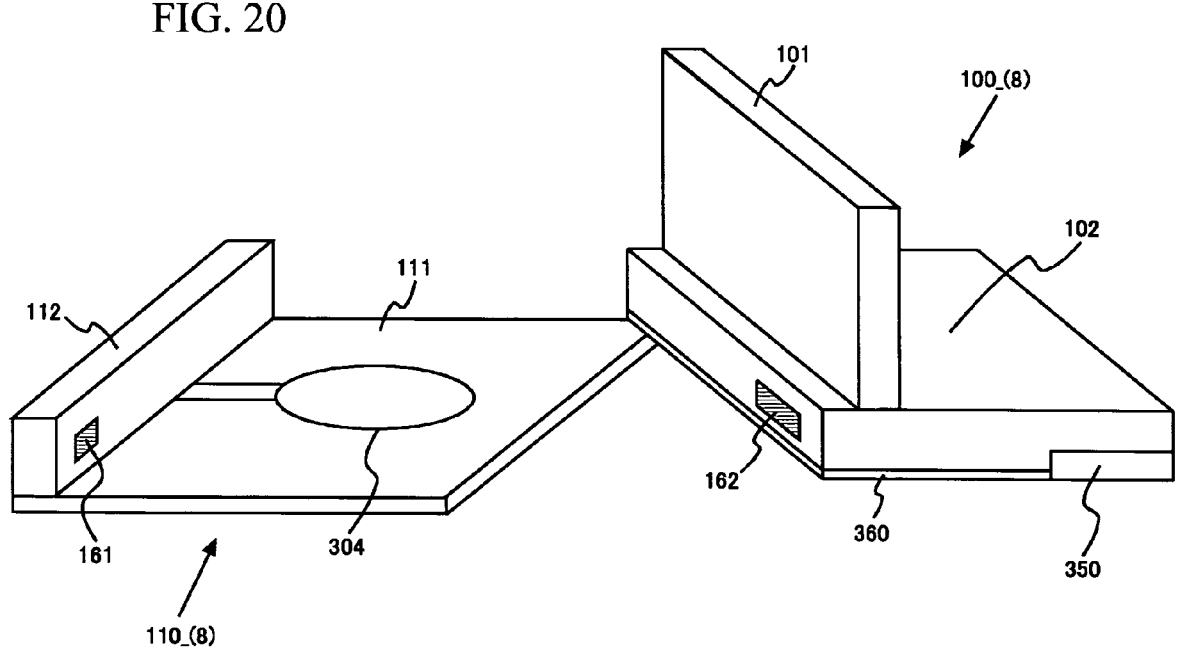
FIG. 20 shows a primary coil included in the tray portion and an arrangement of the console portion when the battery is charged.
Figure 21:
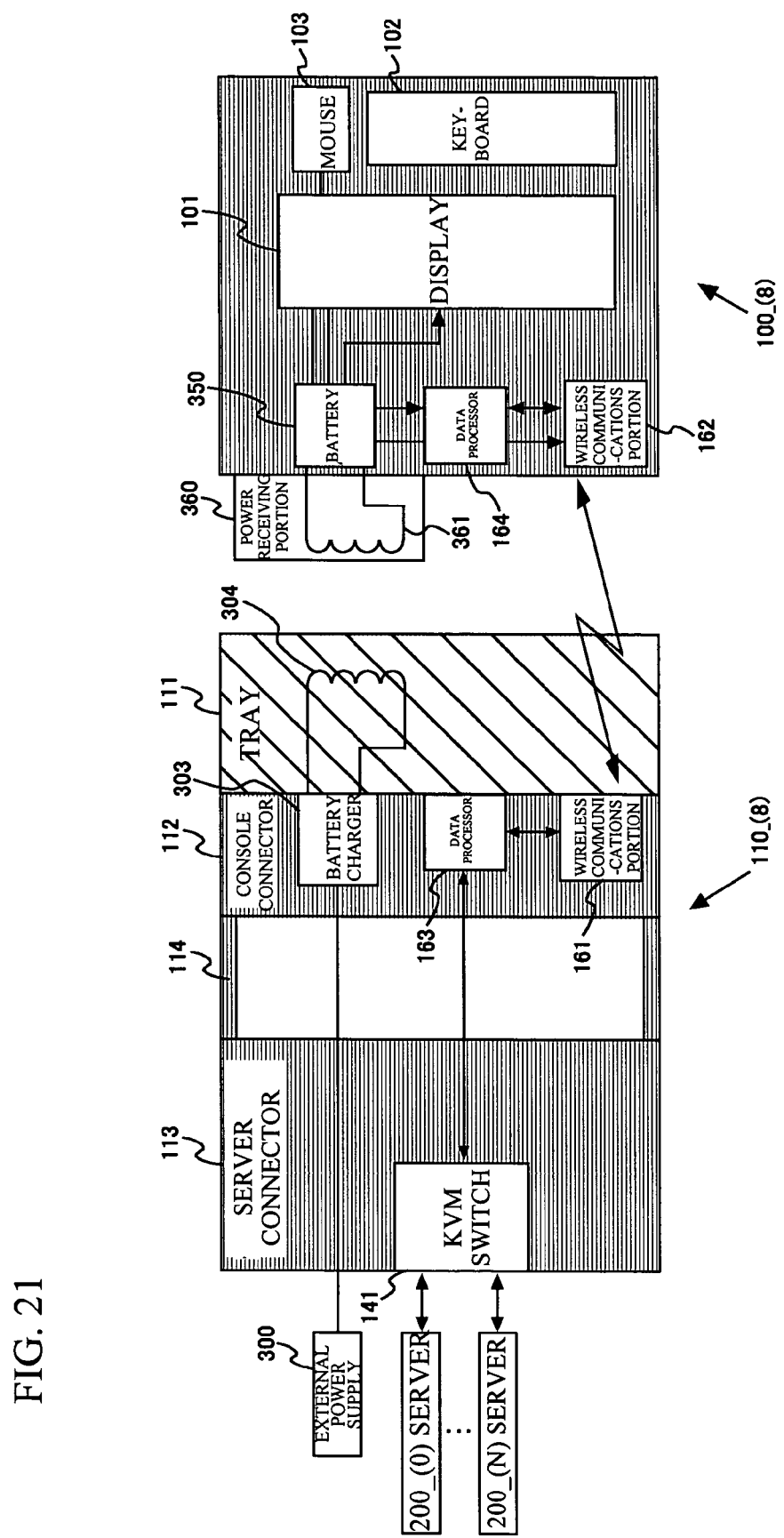
FIG. 21 shows a configuration of the tray portion and the console portion when the battery is charged by using the electromagnetic induction phenomena.

FIG. 21 shows a configuration of a system for charging the battery 350 with the use of the electromagnetic induction phenomena. An oscillating circuit 303 and the primary coil 304 are provided in a tray portion 110_(8) so that the power may be supplied to the oscillating circuit 303 from the external power supply 300 such as the uninterruptible power supply system or the like. The console portion 100_(8) includes the power receiving portion 360 having the secondary coil 361 as well as the battery 350 that stores the power received by the power receiving portion 360. The secondary coil 361 is provided on a backside of the console portion 100_(8) as shown in FIG. 20, and is connected to the power receiving portion 360. A transformer is formed when the primary coil 304 and the secondary coil 361 come close to each other, and the power is transferred to the power receiving portion 360. Generally, the primary coil 304 and the secondary coil 361 come close to each other in a direction that the flux travels to transfer the power efficiently. The number of turns of each coil, the constant number of a rectifier capacitor, not shown, provided in the power receiving portion 360, and the oscillating frequency of the oscillating circuit 303 are adjusted so that the power may be transferred efficiently. In this manner, the battery 350 is charged by simply placing the console portion 100_(8) on the tray 111, and thereby enhancing the convenience for the operator. In addition, the connecting portion such as a connector is not provided, and accordingly, the abrasion of the connector can be prevented.

In the present embodiment, an example of mounting the battery has been described. However, a fuel cell may be mounted instead of the battery. In addition, the display 101 may display the charge status of the battery so that the timing for charge may be shown. Furthermore, an LED may be mounted for notifying the charge status of the battery. For example, a green light turns on to show the full charge, an orange light turns on when the charge amount is reduced to two-thirds, and a red light turns on when the charge amount is further reduced to one-thirds. As another method, there may be provided an LCD to show the charge status.

Figure 22:
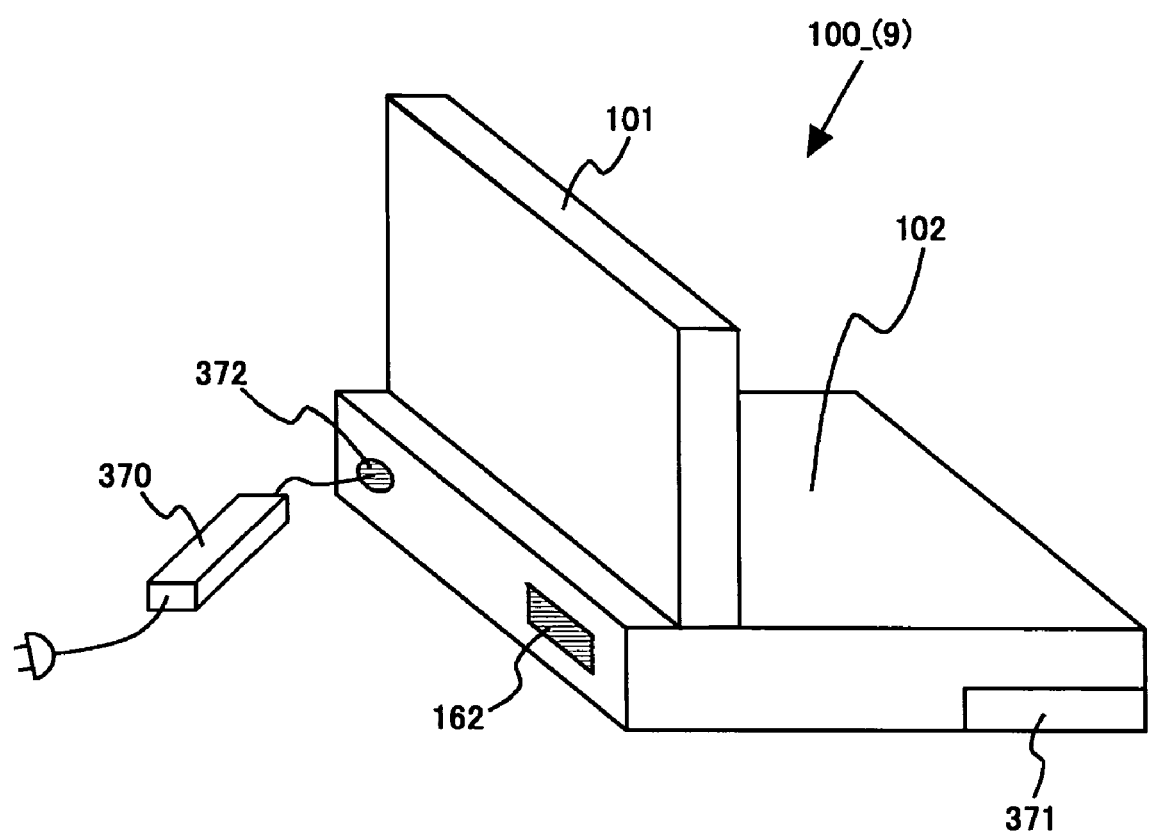
FIG. 22 shows the console portion having a power supply adaptor.
Figure 23:
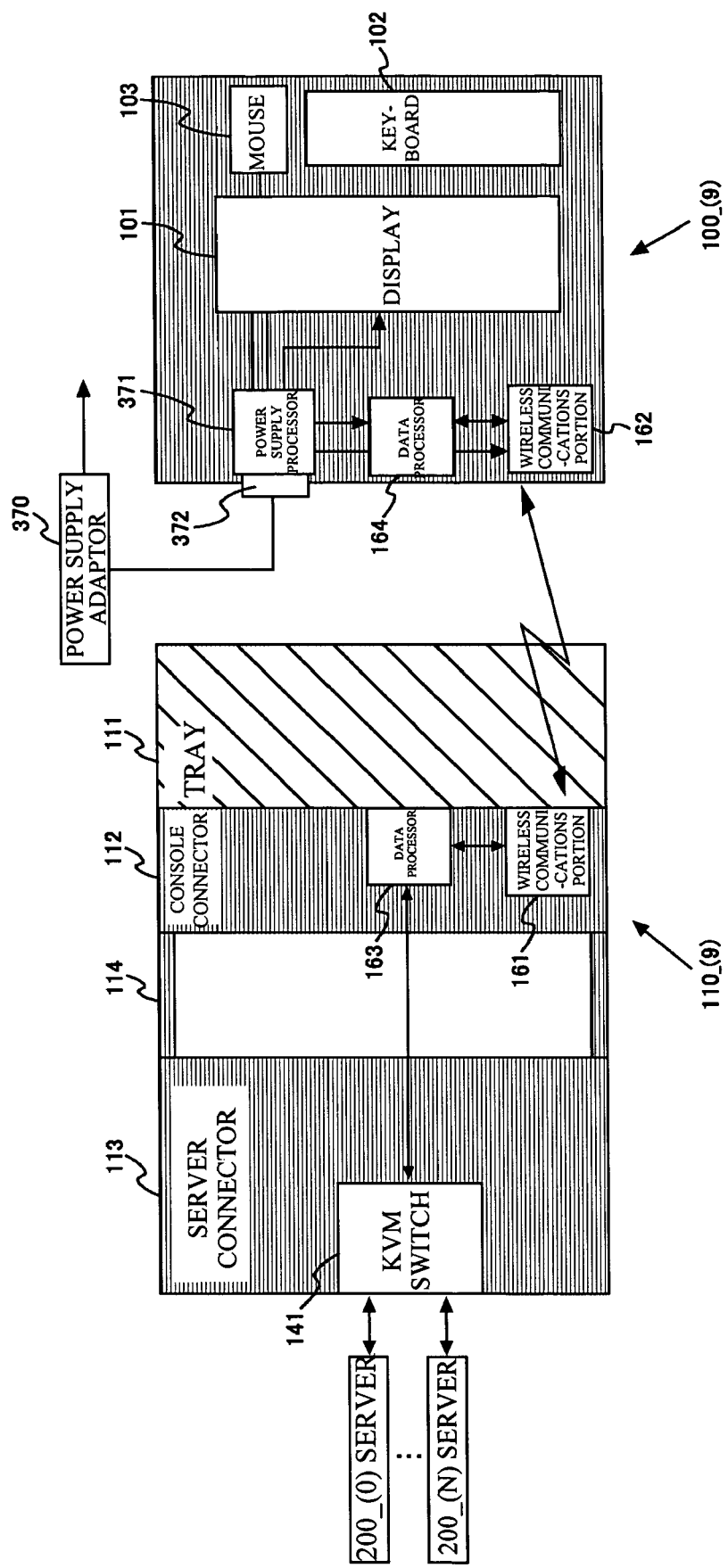
FIG. 23 shows a configuration in which a power cable having the power supply adaptor is connected to supply the power to the console portion.

Referring now to FIG. 22, a cable jack 372 may be provided on a console portion 100_(9) so as to connect the power cable having a power supply adaptor. Referring now to FIG. 23, a power supply processor 371 receives the power from an external power supply via a power supply adaptor 370. The power supply processor 371 also functions as a battery and charges the power while being connected to the external power supply. The power supply processor 371 supplies the power to the display 101, the keyboard 102, the mouse 103, the data processor 164, the wireless communications portion 162, and the like.

On the above-mentioned console apparatus, the tray portion may include a communication portion that communicates with the server apparatus and a console connector that connects the console portion; and the communication portion and the console connector are connected by wire. The console portion and the console connector are connected by wire, making it possible to operate the server apparatus properly with the console portion.

On the above-mentioned console apparatus, the tray portion may include a communication portion that communicates with the server apparatus and a console connector that connects the console portion; and the console portion and the console connector are connected by wireless. This eliminates a cumbersome process in connecting and disconnecting between the console portion and the console connector.

On the above-mentioned console apparatus, the tray portion may include a first conversion portion that converts an analogue signal applied from the server apparatus into a digital signal to create packet data. The tray portion may further include a network output portion that receives the packet data from the first conversion portion and outputs onto a network cable. The console portion may include a second conversion portion that receives the packet data from the network cable and converts the packet data into the analogue signal. The tray portion and the console portion are communicated by a network cable, making it easier to connect the tray portion and the console portion. Accordingly, even if the information amount of data is increased, it is possible to carry out the data communication between the tray portion and the console portion.

On the above-mentioned console apparatus, the console portion may include a battery. The tray portion may include a battery charger that charges the battery. Accordingly, the console portion may be operated solely.

The present invention is not limited to the above-mentioned embodiments, and other embodiments, variations and modifications may be made without departing from the scope of the present invention.

The present invention is based on Japanese Patent Application No. 2004-347756 filed on Nov. 30, 2004, and Japanese Patent Application No. 2005-317720 filed on Oct. 31, 2005, the entire disclosures of which are hereby incorporated by reference.

What is claimed is:

1. A system comprising:
multiple rack-mount systems; and
one or more console portions,
said multiple rack-mount systems respectively mounting multiple server apparatuses on multiple rack chassis, wherein
each of the multiple rack chassis has a tray portion to house any one of the one or more console portions, wherein the console portion communicates with the said any one of the rack-mount systems through the tray portion and said any one of the rack-mount systems communicates with the console portion through the tray portion;
each of the one or more console portions is detachably provided from the tray portion,
the one or more console portions control and operate said multiple server apparatuses mounted on said multiple rack-mount systems,
each one of the one or more console portions sends a scan code output from a keyboard and mouse data output from a mouse to any one of the multiple server apparatuses, and receives a video signal from any one of the multiple server apparatuses, and
a number of the one or more console portions is less than a number of the multiple server apparatuses.

2. The system as claimed in claim 1, wherein a wireless communication portion is respectively included in said multiple rack-mount systems to enable said multiple server apparatuses to communicate with the tray portion wirelessly.

3. The system as claimed in claim 1, wherein the tray portion includes a wireless communication portion that enables wireless communication between the rack-mount system and the tray portion.

4. A console apparatus, comprising:
a tray portion that is attached to a rack chassis and is electrically connected to multiple servers, to select any one of the multiple servers; and
a console portion that is detachably supported by the tray portion, is electrically connected to the tray portion and with which said any one of the multiple servers can be operated,
wherein the console portion communicates with the said any one of the multiple severs through the tray portion and said any one of the multiple servers communicates with the console portion through the tray portion.

5. The console apparatus as recited in claim 4, wherein the connection is by wire.

6. The console apparatus as recited in claim 4, wherein the connection is by wireless.

7. The console apparatus as recited in claim 4, wherein the communication includes the console portion sending a scan code output from a keyboard of the console portion and mouse data from a mouse of the console portion through the tray portion to said any one of the multiple serves and receiving a video signal from the tray portion.

* * * * *

UNITED STATES PATENT AND TRADEMARK OFFICE
CERTIFICATE OF CORRECTION

PATENT NO. : 7,808,793 B2  
APPLICATION NO. : 11/289411  
DATED : October 5, 2010  
INVENTOR(S) : Naoyuki Nagao et al.

Page 1 of 1

It is certified that error appears in the above-identified patent and that said Letters Patent is hereby corrected as shown below:

Claim 4, Column 12, line 52, change "severs" to --servers--;

Claim 7, Column 12, line 63, change "severs" to --servers--.

Signed and Sealed this  
Eleventh Day of January, 2011

David J. Kappos  
*Director of the United States Patent and Trademark Office*